United States Patent [19]

Hoeschele et al.

[11] Patent Number: 5,120,822
[45] Date of Patent: Jun. 9, 1992

[54] POLYESTER PROCESS COMPRISING THE ADDITION OF A TETRAALKYL ZIRCONATE CATALYST

[75] Inventors: Guenther K. Hoeschele, Wilmington, Del.; Richard H. McGirk, Beaumont, Tex.

[73] Assignee: E. I. Du Pont de Nemours and Company, Wilmington, Del.

[21] Appl. No.: 570,921

[22] Filed: Aug. 21, 1990

[51] Int. Cl.$^5$ .................. C08G 63/02; C08G 63/00
[52] U.S. Cl. ..................................... 528/272; 528/176
[58] Field of Search ........................... 528/176, 272

[56] References Cited

U.S. PATENT DOCUMENTS

| | | | |
|---|---|---|---|
| 3,326,965 | 6/1967 | Schultheis et al. | 260/475 |
| 3,915,936 | 10/1975 | Vollkommer et al. | 528/304 |
| 4,424,140 | 1/1984 | Weinberg et al. | 502/155 |
| 4,468,489 | 8/1984 | Weinberg et al. | 524/136 |

*Primary Examiner*—John Kight, III
*Assistant Examiner*—T. Mosley

[57] ABSTRACT

In a process for preparing polyesters by mixing at least one non-vicinal aliphatic diol, e.g., 1,4-butanediol or its ester-forming equivalents with at least one dicarboxylic acid, e.g., terephthalic acid or its ester-forming equivalents in the presence of a tetraalkyl titanate catalyst, and adding to the mixture a tetraalkyl zirconate catalyst in amounts such that the ratio of titanium atoms to zirconium atoms is 1.3:1 to 9:1, preferably 1.9:1 to 4.6:1.

10 Claims, No Drawings

POLYESTER PROCESS COMPRISING THE ADDITION OF A TETRAALKYL ZIRCONATE CATALYST

BACKGROUND OF THE INVENTION

Tetraalkyl titanates are known to be useful as esterification catalysts for the preparation of polyesters by the reaction of diacids or their ester-forming equivalents with diols or their ester-forming equivalents. With little question, the tetraalkyl titanates are preferred catalysts for the preparation of poly(butylene terephthalate) and copolyetherester elastomers having butylene terephthalate hard segments and polyether soft segments.

While the tetraalkyl titanates are highly effective per se, numerous investigators have studied modification of these catalysts by reacting tetraalkyl titanates with compounds of other metals to form complex compounds or by using titanate catalyst in combination with catalytically active compounds of other metals. These studies had objects such as increasing the activity of the titanates, reducing degradative side reactions, improving color and product quality, etc.

U.S. Pat. No. 3,326,965 to Schultheis et al. discloses the preparation of polyesters from diacids and diols in the presence of a wide variety of titanium compounds or zirconium compounds or mixtures thereof. Although tetraalkyl titanates and tetraalkyl zirconates are disclosed as members of extensive lists of titanium and zirconium compounds, no mixtures are exemplified much less ratios of titanium to zirconium and no advantage is taught in the patent for such mixtures. The disclosures of U.S. Pat. No. 3,326,965 are in contrast to the disclosures of U.S. Pat. No. 2,822,348 to Haslam which teaches that tetraalkyl titanates are highly effective esterification catalysts and tetraalkyl zirconates are inactive. This patent does not suggest the use of combinations of tetraalkyl titanates and zirconates.

SUMMARY OF THE INVENTION

The activity of tetraalkyl titanate esterification catalysts can be increased and the side reactions associated with their use can be reduced by the present invention which can be described as an improvement over the process of preparing polyesters by reacting at least one non-vicinal aliphatic diol or its ester-forming equivalents with at least one carboxylic acid or its ester-forming equivalents in the presence of a tetraalkyl titanate catalyst, said improvement comprising the addition of a tetraalkyl zirconate catalyst in amounts such that the ratio of titanium atoms to zirconium atoms is 1.3:1 to 9:1, and preferably 1.9:1 to 4.6:1. The increase in catalyst activity provided by the improved process permits the use of lower total concentrations of catalyst while retaining the same rate of reaction; or conversely provides greater rates of reaction at the same concentration of catalysts.

An especially preferred embodiment of the improved process comprises the preparation of polyesters wherein said diol reactant is 1,4-butanediol either alone or in admixture with minor amounts on a molar basis of other diols. Use of the present invention to prepare butanediol-based polyesters yields superior products in terms of lower acidity and improved color as well as providing increased catalyst activity.

A further embodiment of the present invention comprises the polyesters prepared by the improved process.

DETAILED DESCRIPTION OF THE INVENTION

The polyesters which can be prepared by the process of this invention include any polyesters which can be prepared by the reaction of diols or their ester-forming equivalents with diacids or their ester-forming equivalents in the presence of a tetraalkyl titanate catalyst. Polyesters prepared by procedures wherein at least some stage of the process is carried out in the presence of a tetraalkyl titanate catalyst are also considered to be within the scope of this invention. Illustrative of what is meant by the term "at least some stage of the process" would be the preparation of poly(butylene terephthalate) by polycondensation of di(4-hydroxybutyl) terephthalate in the presence of a tetraalkyl titanate catalyst together with the tetraalkyl zirconate, with di(4-hydroxybutyl) terephthalate having been first prepared by reaction of excess 1,4-butanediol with terephthalic acid in the presence of catalysts such as manganese acetate. In other words, it is not necessary for the entire preparation of a polyester from its monomers to take place in the presence of a titanate catalyst for the process and resulting polyester to be within the scope of this invention.

Representative non-vicinal diols useful in this process include acyclic and cyclic aliphatic diols such as 1,3-propylene, 1,4-butylene, hexamethylene, 2,2-dimethyltrimethylene, decamethylene and dodecamethylene glycols, 1,4-butene-2-diol, 1,3- and 1,4-dihydroxycyclohexane and and cyclohexanedimethanol. Diols such as alpha,alpha '-dihydroxy-p-xylene and 1,4-di(beta-hydroxyethyl)benzene wherein the hydroxyl groups are aliphatic even though an aromatic ring is present are also representative of useful diols. The term "non-vicinal" as used herein with reference to diols excludes "vicinal" diols in which the two hydroxyl groups are on adjacent carbon atoms, e.g., ethylene glycol, 1,2-propylene glycol, 1,2-hexanediol and 1,2-dihydroxycyclohexane. The process is particularly useful for preparing polyester based on diols having 3–6 carbon atoms, and is especially preferred for preparing polyesters of 1,4-butanediol. In addition to low molecular weight diols, polymeric glycols having number average molecular weights up to about 6000 are also useful. These include poly(ethylene oxide) glycols, poly(propylene oxide) glycols, ethylene oxide-capped poly(propylene oxide) glycols, poly(tetramethylene oxide) glycols, polybutadiene glycols, hydrogenated polybutadiene glycols and diols obtained by hydrogenation of the carboxyl groups on dimer acids.

While the diols are usually used as such, their ester-forming derivatives may also be used. These derivatives include esters of the diols such as their diacetates.

Representative dicarboxylic acids that can be used in this invention include aliphatic, cycloaliphatic and aromatic dicarboxylic acids such as succinic acid, glutaric acid, adipic acid, capric acid, dodecanedioic acid, dimer acid, cyclohexane dicarboxylic acid, 2,2,3,3-tetramethyl succinic acid, decahydro-1,5-naphthalene dicarboxylic acid, 4,4,'-bicyclohexyl dicarboxylic acid, 4,4,'-methylenebis(cyclohexane carboxylic acid), terephthalic acid, isophthalic acid, dibenzoic acid, naphthalene dicarboxylic acid, bis(p-carboxyphenyl) methane, 4,4,'-sulfonyl dibenzoic acid and substituted derivatives thereof. Preferably, the dicarboxylic acids used are aromatic dicarboxylic acids that contain 8–16 carbon atoms, especially the phenylene dicarboxylic acids, i.e., terephthalic, phthalic and isophthalic acids. Preferred aliphatic dicarboxylic acids include cyclohexane dicarboxylic acids and adipic acid. Polymeric acids such as butadiene dicarboxylic acids and the diamide diacid polyesters described in U.S. Pat. Nos. 4,556,688 and 4,556,705 to McCready et al. are also useful, as are the polyamide diacids described in U.S. Pat. No. 4,331,786.

The dicarboxylic acids may be used as such to prepare polyesters; however, their ester-forming equivalents, particularly their di-lower alkyl esters, often may be preferred. Acid anhydrides are another ester-forming equivalent which can be useful for preparing the polyester.

Small amounts of polyols having more than two hydroxyl groups and/or polycarboxylic acids having more than two carboxyl groups may be present in the starting materials or added to the reaction mass. The presence of such compounds, of which trimethylol propane and trimethylol trimillitate are representative, usually in amounts of less than about six hydroxyl and-/or carboxyl equivalents per 100 moles of dicarboxylic acid introduces branching into the polyesters. Excessive amounts of polyols or polyacids result in gellation of the polymer.

Polyesters in which the diol component is principally provided by 1,4-butanediol on a molar basis represent a class of polyesters which are most advantageously prepared by the instant process. The improved process of this invention permits the use of lower catalyst concentrations and yields polyesters which exhibit improved melt stability, lower carboxyl group concentration and improved color. Important commercial polyesters based on 1,4-butanediol include poly(butylene terephthalate) and copolyetherester elastomers in which the hard segments consist mainly of repeating butylene terephthalate units. The copolyetherester elastomers based on 1,4-butanediol are usually prepared by reacting excess, or a major portion of, 1,4-butanediol, optionally containing minor amounts of other low molecular weight diols such as 1,4-butene-2-diol, 1,6-hexanediol and 1,4-cyclohexanedimethanol; a polyether glycol having number average molecular weights of about 400–6000; and terephthalic acid, optionally containing minor amounts of isophthalic acid, or the corresponding dimethyl esters. Related products can be prepared in which the soft segments of the copolyetherester elastomer furnished by the polyether glycol are furnished by a long-chain diacid such as dimer acid or the diimide diacids described hereinbefore.

The improved polyester process of the present invention comprises replacing a tetraalkyl titanate esterification catalyst with a combination of a tetraalkyl titanate and a tetraalkyl zirconate in amounts such that the ratio of titanium atoms to zirconium atoms is 1.3:1 to 9:1, and preferably 1.9:1 to 4.6:1. When the tetraalkyl titanates and zirconates are used in the stated proportions an increase in the rate of esterification is obtained compared to the rate at the same level of tetraalkyl titanate in the absence of tetraalkyl zirconate. This increase is consistently observed with a wide variety of monomers, as illustrated herein, regardless of other process parameters such as temperature, pressure, cycle time, etc., as long as observed rates are limited by reaction kinetics rather than by mass transfer limitations. The increased catalyst activity observed for the combination is surprising in that the tetraalkyl zirconates per se are ineffective as esterification catalysts as disclosed by Haslam in U.S. Pat. No. 2,822,348 and confirmed in connection with the present invention.

The titanates and zirconates useful in the present process may be represented by the general formula $M(OR)_4$, wherein M is titanium (Ti) or zirconium (Zr) and R is an alkyl group. The four R's in the tetraalkyl derivatives are usually the same in commercially available titanates and zirconates but could represent two or more alkyl groups if mixtures of alcohols were used in making the compounds. Suitable alkyl groups (—R) include ethyl, propyl, isopropyl, n-butyl, sec.-butyl, hexyl, octyl, decyl and dodecyl radicals. Lower alkyl radicals of one to six carbons are preferred.

The catalyst combination of this invention is added at the same process stage at which the prior art tetraalkyl titanates would be added. Usually this would mean that the titanate and zirconate would be charged along with the reactants required to make the polyester. The titanate and zirconate can be added in any order but it is usually more convenient to premix the titanate and zirconate in the proper proportions and introduce the premix to the reaction system. The catalyst combination is equally useful in preparing polyesters by batch or continuous procedures.

The concentration of the improved catalyst combination of this invention which is used in a given preparation of a polyester is conveniently discussed as it relates to the concentration of prior art tetraalkyl titanate catalyst which would be used in preparing the same polyester. Tetraalkyl titanate catalysts are used in polyesterification in concentrations corresponding to about 10–500 ppm, more usually 50–400 ppm, of elemental titanium based on the theoretical weight of the polymer produced. Since the improved catalyst of this invention has substantially greater activity at the same concentration of elemental titanium, it is possible to maintain the reaction rate observed with a given concentration of tetraalkyl titanate used alone by using less of the titanium-zirconium catalyst combination. Because the capacity of most commercial scale operations for the preparation of polyesters are limited by mass transfer of polyester reaction by-products, the improved catalyst of this invention permits maintaining the reaction rate while using substantially lower concentrations of catalyst which in turn provides polyesters of improved quality in terms of acidity, color and thermal stability. Alternatively, in systems where the rate of polyester formation is limited by reaction kinetics, increases in reaction rate can be achieved by replacing a given concentration of tetraalkyl titanate catalyst with an equal concentration of the tetraalkyl titanate and tetraalkyl zirconate catalyst of this invention. In a more general sense, the novel catalyst of this invention is like any other catalyst in that it should be used in the lowest concentration which provides the desired rate of reaction in a given situation. Because of its greater activity, the present catalyst can be used at lower concentrations than the prior art tetraalkyl titanates catalysts.

EXAMPLES

EXAMPLE 1

A-1) To a 600 liter reactor the following starting materials were charged:
26.98 kg dimethyl terephthalate
15.62 kg polytetramethylene ether glycol having a number average molecular weight of 1000
16.3 kg 1,4-butanediol 34.9 g trimethyl mellitate
68 g
1,3,5-trimethyl-2,4,6-tris(3,5-di-ter-butyl-4-hydroxylbenzyl)benzene
54.4 g tetrabutyl titanate obtained for Control Run C-1 demonstrate the importance of the proper Ti/Zr ratio for achieving high catalyst activity. Control Run C-1 required a longer finishing time than did Control C-2 which contained the same amount of Ti but no zirconium.

TABLE

| | Polymerization Run | | | | | |
|---|---|---|---|---|---|---|
| | A-1 | A-2 | A-3 | C-1 | C-2 | C-3 |
| Catalyst Composition | | | | | | |
| Tetrabutyl titinate, % | 0.12 | 0.12 | 0.12 | 0.12 | 0.12 | 0.3 |
| Tetrapropyl zirconate, % | 0.032 | 0.015 | 0.088 | 0.176 | — | — |
| Ti, ppm | 171 | 171 | 171 | 171 | 170 | 325 |
| Zr, ppm | 90 | 42 | 248 | 495 | — | — |
| Ti/Zr Atomic Ratio | 3.6 | 7.5 | 1.31 | 0.66 | ∞ | ∞ |
| Process Conditions | | | | | | |
| Pressure, mm Hg | 1.1 | 1.0 | 1.7 | 1.2 | 2.8 | 1.1 |
| Finishing time. min (1) | 47 | 65 | 65 | 90 | 80 | 70 |
| Physical Properties | | | | | | |
| Melt index, g/10 min at 220° C. by ASTM D-1238 | 7.35 | 6.5 | 7.5 | 8.4 | 6.45 | 6.7 |

(1) Polymerization time under full vacuum.

14.5 g tetrapropyl zirconate, 100% (added as a 75% solution in n-propanol).

The charge was heated to 200° C. with agitation while methanol was distilling off. After the methanol distillation was completed, the charge was transferred by suction to a heated 430 liter autoclave equipped with a Helix type agitator. The mixture was subsequently heated to 250° C. over a period of 45 minutes while the pressure was gradually reduced to <400 Pa following a predetermined pressure-time cycle. During the final polycondensation step, the reaction mixture was agitated at a constant rate of 15 rpm at 250° C. under full vacuum until the melt viscosity—measured by the increase of the power load on the agitator—reached the desired level. The desired level corresponded to a product having a melt viscosity such that it could be discharged from the reactor without difficulty. After the vacuum was released under nitrogen the polymer melt was extruded, quenched in a water bath and then shredded.

A-2) The procedure described in A-1 was substantially repeated except that 54.5 g tetrabutyl titanate and 6.8 g tetrapropyl zirconate was used as the catalyst.

A-3) The procedure described in A-1 was substantially repeated except 54.5 g of tetrabutyl titanate and 40.0 g of tetrapropyl zirconate was used as the catalyst.

C-1) For control purposes the procedure described in A-1 was substantially repeated except that 54.5 g tetrabutyl titanate and 79.8 g tetrapropyl zirconate was used as catalyst.

C-2 and C-3) For control purposes the procedure described in A-1 was substantially repeated except that 54.4 g tetrabutyl titanate (C-2) and 136 g tetrabutyl titanate (C-3), respectively, was used as catalyst. No zirconate was added.

The polymerization data for all six runs are shown in the Table. It is evident from the results that the catalyst used in Run A-1 having a Ti/Zr atomic ratio of 3.6, which is within the preferred range of this improved process, was more active than the catalysts used for runs A-2 and A-3 as indicated by the shorter finishing time. Runs A-2 and A-3 which are near the upper and lower limits of, but within the broad range of this invention still exhibit faster finishing times than do any of the control runs. Run A-1 finished much faster than even Control Run C-3 which contained 1.64 times as much Ti as the sum of Ti and Zr in Run A-1. The results

EXAMPLE 2

Polyester 2-A is prepared by placing the following materials in an agitated flask fitted for distillation:
  52.9 g dimethyl terephthalate
  36.0 g 1,4-butanediol
  0.044 g tetrabutyl titanate (104 ppm Ti)
  0.012 g tetrapropyl zirconate (55 ppm Zr).

A stainless steel agitator with a paddle cut to conform to the internal radius of the flask is positioned about ⅛ inch from the bottom of the flask and agitation is started. The flask is placed in an oil bath at 160° C., agitated for five minutes and then the catalyst is added. Methanol distills from the mixture as the temperature is raised to 250° C. over a period of about 20 minutes. When the pressure reaches 250° C., the pressure is gradually reduced to 0.3 mm Hg over 20 minutes. The polymerization mass is agitated at 250° C./0.3 mm Hg until the rpm's of the agitator which is driven by a motor providing a constant power level decrease to a predetermined level. The time required to reach the predetermined rate of agitation starting from the time when the pressure first reaches 0.3 mm Hg is considered the finishing time. For polyester 2-A, the finishing time is 27 minutes. The melt index of the polymer by ASTM D-1238 is 9.8 g/10 minutes at 240° C.

Polymer 2-B, a control, is prepared by repeating the procedure used to prepare polyester 2-A with the exception that tetrapropyl zirconate is omitted. The finishing time with 104 ppm Ti is 37 minutes, a 37% increase over that observed for polyester 2-A which contains 104 ppm Ti and 55 ppm Zr and has a Ti/Zr ratio of 3.6. The melt index of polyester 2-B is 12.5 g/10 minutes at 240° C.

EXAMPLE 3

Polyester 3-A is prepared from the following materials using the equipment and the procedure described in Example 2.
  18.73 g dimethyl terephthalate
  5.43 g dimethyl isophthalate
  33.2 g ethylene oxide-capped poly(propylene oxide) glycol, number average molecular weight 2150; 30% by weight ethylene oxide
  15.0 g 1,4-butanediol
  0.2 g trimethyl trimellitate 0.3 g 1,3,5-trimethyl-2,4,6-tris(3,5-di-t-butyl-4-hydroxybenzyl) benzene
0.066 g tetrabutyl titanate (147 ppm Ti)
0.018 g tetrapropyl zirconate (80 ppm Zr).

The pressure/temperature time cycle described in Example 2 is followed in preparing polyester 3-A. After the pressure reaches 0.3 mm Hg at 250° C., the finishing time is 25 minutes. The melt index of polyester 3-A is 10.7 g/10 minutes at 190° C.

Polyester 3-B, a control, is prepared by repeating the procedure used for polyester 3-A except that tetrapropyl zirconate is omitted. The finishing time with 147 ppm Ti is 37 minutes, a 48% increase over the mixed catalyst which has a Ti/Zr ratio of 3.6. The melt index of polyester 3-B is 9.54 g/10 minutes at 190° C.

EXAMPLE 4

Polyester 4-A is prepared from the following materials using the equipment and the procedure described in Example 2.
46.8 g dimethyl terephthalate
42.8 g 1,6-hexanediol
0.073 g tetrabutyl titanate (172 ppm Ti)
0.020 g tetrapropyl zirconate (93 ppm Zr).

The pressure/temperature time cycle of Example 2 is followed and the finishing time (the time to completion after the pressure reaches 0.3 mm Hg) for polyester 4-A is 45 minutes. The melt index of the polyester is 27.2 g/10 minutes at 180° C.

Polyester 4-B, a control, is prepared by repeating the procedure for polyester 4-A except that 0.079 g of tetrabutyl titanate (186 ppm) is used and tetrapropyl zirconate is omitted. The finishing time is 51 minutes, a 13% increase over the mixed catalyst which has a Ti/Zr ratio of 3.6. The melt index of 4-B is 21.1 g/10 minutes at 180° C.

EXAMPLE 5

Polyester 5-A is prepared from the following materials using the equipment and procedure described in Example 2.
31.75 g dimethyl terephthalate
21.9 g dimer acid, molecular weight 565
26.7 g 1,4-butanediol
0.15 g 1,3,5-trimethyl-2,4,6-tris(3,5-di-t-butyl-4-hydroxybenzyl)benzene
0.06 g trimethyl trimellitate
0.088 g tetrabutyl titanate (205 ppm Ti)
0.024 g tetrapropyl zirconate (111 ppm Zr).

The pressure/temperature time cycle of Example 2 is followed and the finishing time (the time to completion after the pressure reaches 0.3 mm Hg) for polyester 5-A is 20 minutes. The melt index of the polyester is 4.8 g/10 minutes at 220° C. The Ti/Zr ratio is 3.6.

Polyester 5-B, a control, is prepared by repeating the procedure for polyester 5-A except that 0.095 g of tetrabutyl titanate (222 ppm Ti) is used and tetrapropyl zirconate is omitted. The finishing time is 25 minutes, a 25% increase. The melt index of 5-B is 7.0 g/10 minutes at 220° C.

We claim:

1. In a process for preparing polyesters by reacting at least one non-vicinal aliphatic diol or its ester-forming equivalents with at least one dicarboxylic acid or its ester-forming equivalents in the presence of a tetraalkyl titanate catalyst, the improvement comprising the addition of a tetraalkyl zirconate catalyst in amounts such that the ratio of titanium atoms to zirconium atoms is 1.3:1 to 9:1.

2. A process of claim 1 wherein the ratio of titanium atoms to zirconium atoms is 1.9:1 to 4.6:1.

3. A process of claim 1 wherein the ester-forming equivalent of the dicarboxylic acid is a di-lower alkyl diester.

4. A process of claim 1 wherein the diol is 1,4-butanediol or mixtures thereof with one or more additional diols, said mixtures containing a major proportion of butanediol on a molar basis.

5. A process of claim 1 wherein the non-vicinal aliphatic diol is 1,4-butanediol and the dicarboxylic acid is terephthalic acid or its ester-forming derivatives.

6. A process of claim 1 wherein the non-vicinal diol is a mixture of 1,4-butanediol and a polyetherglycol having a number average molecular weight of 400-6000 and the dicarboxylic acid is terephthalic acid or its ester forming equivalents or mixtures thereof with isophthalic acid or its ester forming equivalents.

7. A process of claim 1 wherein the non-vicinal diol is 1,4-butanediol and the dicarboxylic acid is a mixture of terephthalic acid or its ester-forming equivalents and dimer acid.

8. A process of claim 1 wherein the alkyl group of the tetraalkyl zirconate contains 1–6 carbon atoms.

9. A process of claim 8 wherein the tetraalkyl zirconate is tetrapropyl zirconate.

10. A process of claim 8 wherein the titinate catalyst is tetrabutyl titinate.

* * * * *